(12) United States Patent
Gaona Rosanes et al.

(10) Patent No.: US 11,552,557 B2
(45) Date of Patent: Jan. 10, 2023

(54) SYSTEM AND METHOD FOR ENHANCED SINGLE-STAGE ONBOARD CHARGER WITH INTEGRATED RECTIFIER

(71) Applicant: Lear Corporation, Southfield, MI (US)

(72) Inventors: Pablo Gaona Rosanes, Valls (ES); Rafael Jimenez Pino, Valls (ES); Oscar Lucia Gil, Saragossa (ES); Hector Sarnago Andia, Ólvega (ES)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/383,605

(22) Filed: Jul. 23, 2021

(65) Prior Publication Data
US 2022/0038019 A1  Feb. 3, 2022

Related U.S. Application Data

(60) Provisional application No. 63/059,588, filed on Jul. 31, 2020.

(51) Int. Cl.
*H02M 1/44* (2007.01)
*H02M 7/219* (2006.01)
(Continued)

(52) U.S. Cl.
CPC ............. *H02M 1/44* (2013.01); *B60L 53/22* (2019.02); *H02M 1/0043* (2021.05);
(Continued)

(58) Field of Classification Search
CPC ............. H02M 1/0043; H02M 1/0067; H02M 1/0083; H02M 1/44; H02M 3/335;
(Continued)

(56) References Cited

U.S. PATENT DOCUMENTS

| 8,587,975 | B2 | 11/2013 | Jain et al. | |
| 9,490,694 | B2 * | 11/2016 | Alam | H02M 1/44 |

(Continued)

FOREIGN PATENT DOCUMENTS

| EP | 3079250 A1 | 10/2016 |
| WO | 2019064259 A1 | 4/2019 |
| WO | 2019199964 A1 | 10/2019 |

OTHER PUBLICATIONS

Related U.S. Appl. No. 17/335,661, filed Jun. 1, 2021, 59 pgs.

*Primary Examiner* — Gary L Laxton
(74) *Attorney, Agent, or Firm* — Brooks Kushman P.C.

(57) ABSTRACT

In at least one embodiment, a vehicle battery charger is provided. At least one transformer includes a first winding and a second winding on a primary side of the transformer that are connected to one another to form a middle point. The middle point of the at least one transformer receives an input voltage signal from a mains supply. A half-bridge rectifier receives the input voltage signal from the mains supply to enable the middle point of the least one transformer to receive the input voltage signal from the mains supply. A first active bridge includes a first plurality of switching devices to receive a first input signal directly from the first winding and to receive a second input signal directly from the second winding. The first input signal and the second input signal are out of phase with one another to minimize electromagnetic interference within the vehicle battery charger.

20 Claims, 9 Drawing Sheets

(51) Int. Cl.
    *H02M 3/335* (2006.01)
    *B60L 53/22* (2019.01)
    *H02M 1/00* (2006.01)

(52) U.S. Cl.
    CPC ..... *H02M 1/0067* (2021.05); *H02M 3/33571* (2021.05); *H02M 1/0083* (2021.05); *H02M 3/33573* (2021.05); *H02M 3/33584* (2013.01); *H02M 3/33592* (2013.01); *H02M 7/219* (2013.01)

(58) Field of Classification Search
    CPC ......... H02M 3/33573; H02M 3/33584; H02M 3/33592; H02M 7/219; B60L 53/22
    See application file for complete search history.

(56) References Cited

U.S. PATENT DOCUMENTS

| | | | |
|---|---|---|---|
| 10,193,437 B1* | 1/2019 | Hari | H02M 7/217 |
| 2016/0016479 A1 | 1/2016 | Khaligh et al. | |
| 2018/0166977 A1* | 6/2018 | Wu | H02M 1/4258 |
| 2018/0278168 A1 | 9/2018 | Brown et al. | |
| 2019/0288607 A1 | 9/2019 | Zong et al. | |
| 2021/0143665 A1 | 5/2021 | Jimenez Pino et al. | |
| 2021/0376741 A1* | 12/2021 | Escudero Rodriguez | H02M 3/33592 |

* cited by examiner

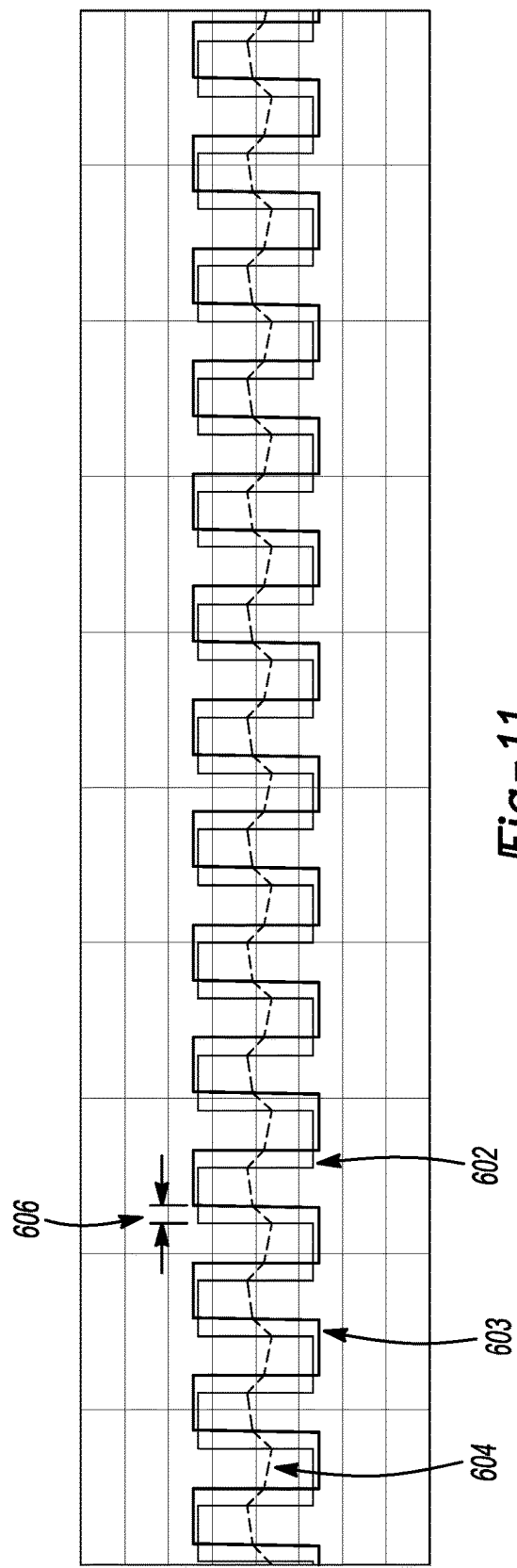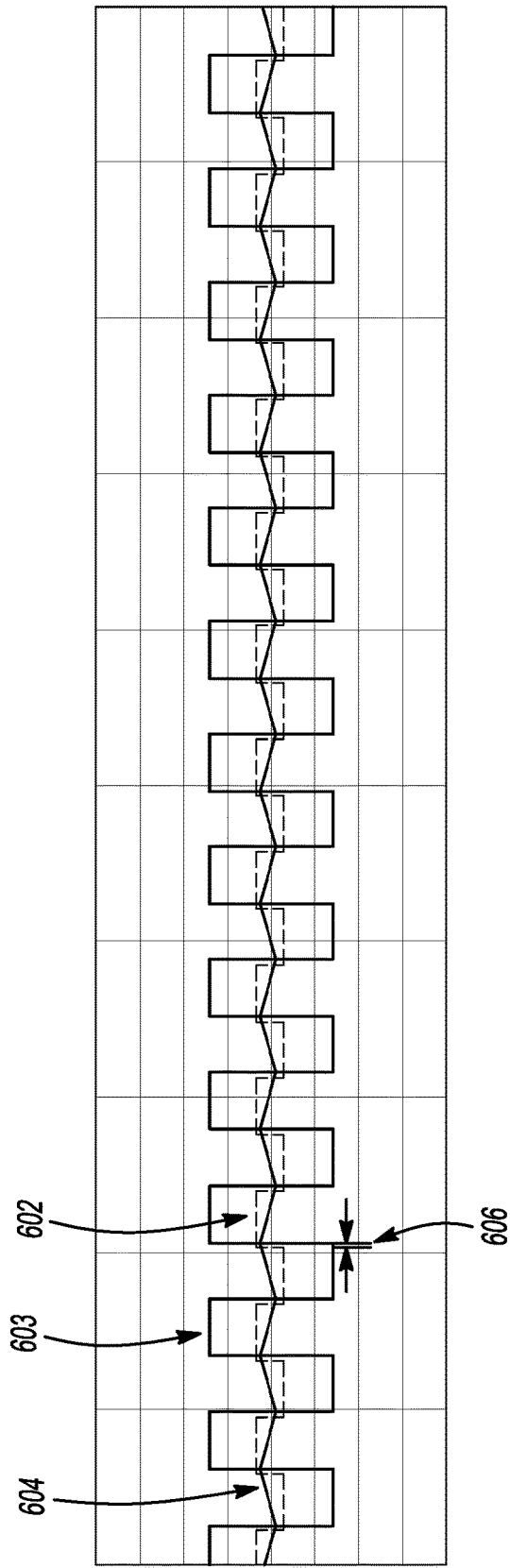

SYSTEM AND METHOD FOR ENHANCED SINGLE-STAGE ONBOARD CHARGER WITH INTEGRATED RECTIFIER

CROSS-REFERENCE TO RELATED APPLICATIONS

This application claims the benefit of U.S. provisional application Ser. No. 63/059,588 filed Jul. 31, 2020, the disclosure of which is hereby incorporated in its entirety by reference herein.

TECHNICAL FIELD

Aspects disclosed herein generally relate to a system and method for providing an enhanced single-stage on-board charger (OBC) with a combined rectifier. In one example, a system and method for provided the enhanced single-stage OBC may be utilized in connection with vehicular applications. These aspects and others will be discussed in more detail herein.

BACKGROUND

U.S. Pat. No. 8,587,975 to Jain et al. discloses a Dual Active Bridge (DAB) converter and a Pulse Width Modulation (PWM) scheme for controlling the DAB converter. In general, the DAB converter includes a transformer, a first H-bridge that is connected to a primary winding of the transformer and controlled via first control signals, and a second H-bridge that is connected to a secondary winding of the transformer and controlled via second control signals. A controller provides the first and second control signals based on an input-to-output voltage ratio and load of the DAB converter such that, in addition to phase shift control, PWM control is simultaneously applied to both the first H-bridge and the second H-bridge when the DAB converter operates at low power and PWM control is applied to only one of the first H-bridge and the second H-bridge when the DAB converter operates above low power.

SUMMARY

In at least one embodiment, a vehicle battery charger is provided. The vehicle battery charger includes at least one transformer, a half-bridge rectifier, and a first active bridge. The at least one transformer includes a first winding and a second winding on a primary side of the transformer that are connected to one another to form a middle point. The middle point of the at least one transformer receives an input voltage signal from a mains supply. The half-bridge rectifier receives the input voltage signal from the mains supply to enable the middle point of the least one transformer to receive the input voltage signal from the mains supply. The first active bridge includes a first plurality of switching devices to receive a first input signal directly from the first winding and to receive a second input signal directly from the second winding. The first input signal and the second input signal are out of phase with one another to minimize electromagnetic interference (EMI) within the vehicle battery charger.

In at least another embodiment, a vehicle battery charger is provided. The vehicle battery charger includes at least one transformer, a half-bridge rectifier, and a first active bridge. The at least one transformer includes a first winding and a second winding on a primary side of the transformer that are connected to one another to form a middle point. The middle point of the at least one transformer directly receives an input voltage signal from a mains supply that is external to a vehicle. The half-bridge rectifier receives the input voltage signal from the mains supply to enable the middle point of the least one transformer to receive the input voltage signal from the mains supply. The first active bridge includes a first plurality of switching devices to receive a first input signal directly from the first winding and to receive a second input signal directly from the second winding. The first input signal and the second input signal are out of phase with one another to minimize electromagnetic interference (EMI) within the vehicle battery charger.

In at least another embodiment, a vehicle battery charger is provided. The vehicle battery charger includes at least one transformer, a half-bridge rectifier, and a first active bridge. The at least one transformer includes a first winding and a second winding on a primary side of the transformer that are connected to one another to form a middle point. The middle point of the at least one transformer directly receives an input voltage signal from a mains supply. The half-bridge rectifier receives the input voltage signal from the mains supply to enable the middle point of the least one transformer to receive the input voltage signal from the mains supply. The first active bridge includes a first plurality of switching devices to receive a first input signal from the first winding and to receive a second input signal from the second winding. The first input signal and the second input signal are out of phase with one another to minimize electromagnetic interference (EMI) within the vehicle battery charger.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 11 depicts a first plot including waveforms of the voltage output across the primary transformer ($V_{o,p}$), the current across the first coil of the primary transformer ($i_{p1}$) and a control variable FI in accordance with one embodiment; and FIG. 12 depicts a second plot including waveforms of the voltage output across the primary transformer ($V_{o,p}$), the current across the first coil of the primary transformer ($i_{p1}$) and the control variable FI in accordance with one embodiment.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

Figure 1:
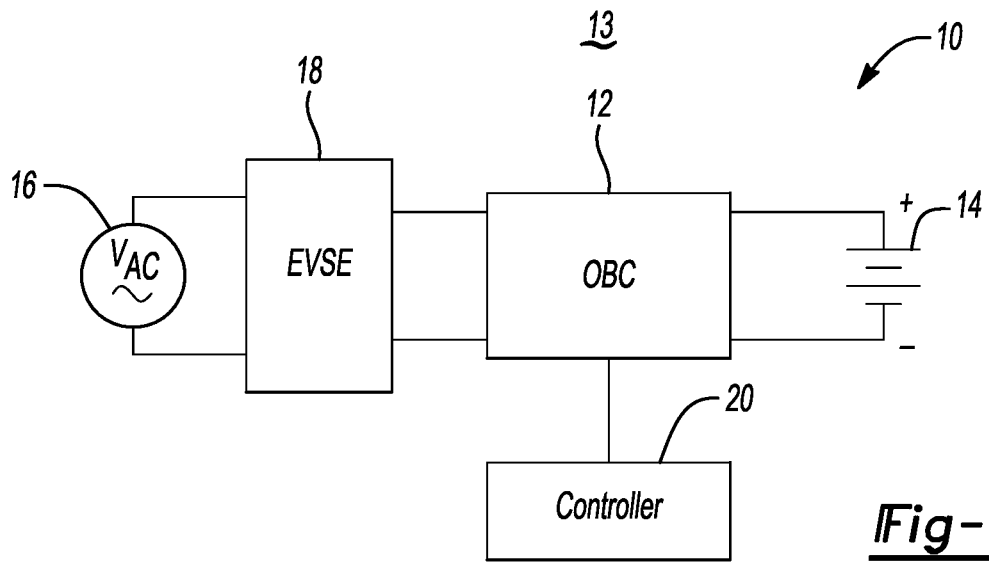
FIG. 1 depicts a block diagram of an electrical system having an on-board charger (OBC)

FIG. 1 generally illustrates a block diagram of an electrical system 10 having an on-board charger (OBC) 12. One example of an OBC is set forth in U.S. application Ser. No. 16/682,398 ("398 application") entitled "ON-BOARD CHARGER (OBC) SINGLE-STAGE CONVERTER" as filed on Nov. 13, 2019 the disclosure of which is hereby incorporated by reference in its entirety. The OBC 12 is generally positioned "on-board" an electric vehicle 13. The term "electric vehicle" herein may encompass any type of vehicle which uses electrical power for vehicle propulsion and encompasses battery-only electric vehicles (BEV), hybrid electric vehicles (HEV), plug-in hybrid electric vehicles (PHEV), and the like. The OBC 12 may be used for charging a traction battery 14 of the electric vehicle 13. The traction battery 14 may be a high voltage (HV) direct current (DC) traction battery as dictated per electrical energy requirements for electric vehicle propulsion.

The electrical system 10 further includes an alternating (AC) power source such as a mains supply 16 of an electrical grid. The OBC 12 charges the traction battery 14 using electrical power from the mains supply 16. The OBC 12 includes an input that connects to the mains supply 16, via an external Electric Vehicle Supply Equipment (EVSE) 18, to absorb electrical power from the mains supply 16. The OBC 12 includes an output that connects to the traction battery 14. The OBC 12 converts electrical power absorbed from the mains supply 16 into DC electrical power and charges the traction battery 14 with the DC electrical power.

A controller 20 is operably coupled to the OBC 12. The controller 20 may be an electronic device such as at least one processor, at least one micro-controller, or the like (e.g., a computer) that is positioned on-board the electric vehicle 13. The controller 20 may be defined as a vehicle controller. The controller 20 is operably coupled to the OBC 12 to control operations of the OBC 12. The controller 20 controls the OBC 12 to convert electrical power from the mains supply 16 into DC electrical power and charging traction battery 14 with the DC electrical power. For example, the controller 20 selectively controls switching and switching duration of power switches (not shown) positioned in the OBC 12. The power switches may be used to convert electrical power received from the mains supply 16 into a predetermined amount of DC electrical power. The controller 20 may communicate and control other nodes of the electrical system 10 and the electric vehicle 13 including nodes involved in the charging applications.

Various OBCs may include a dual stage architecture including a power factor corrector (PFC) and a DC/DC converter (not shown). The PFC and the DC/DC converter may be electrically coupled via a capacitive energy buffer (or a "DC link capacitor") (also not shown). The PFC may be connectable to the mains supply 16 and the DC/DC converter is connected to the traction battery 14. The PFC performs the AC/DC conversion and is controlled by the controller 20 to ensure a high-power factor at the input. The controller 20 controls the DC/DC converter to convert a high-voltage stabilized input at the DC link capacitor into a DC battery level for the traction battery 14. In this regard, the DC/DC converter adapts the output voltage/current to the requirements of the traction battery 14. In sum, the PFC functions as the grid front end and the DC/DC converter adapts the output to the range of the traction battery 14.

The PFC generally includes one or more inductors that may be bulky and costly. The energy conversion scheme of ordinary OBCs inherently requires an energy storage element to store/provide the difference between the instantaneous input power, which is sinusoidal to comply with electromagnetic compatibility (EMC) standards, and the output power, which is expected to be DC value. Presently, due to high-power requirements, the energy storage element utilized may be involve a configuration of electrolytic capacitors (e.g., the DC-link capacitor). The high capacity that may be required may generally lead to bulky capacitors (i.e., the DC link capacitor) which reduces power density (for example, around 30% volume) and has significant implications on the maximum operating temperature and estimated lifetime (e.g., mean time between failures (MTBF)).

Additionally, a PFC and a DC/DC converter may be present for each rail of the OBC 12. Thus, a 3-phase, ordinary OBC may include three sets of PFCs and DC/DC converters. As described above, each set includes several energy storage elements. Namely, each rail includes one or more inductors at the PFC stage and electrolytic capacitors at the DC/DC converter stage. This aspect may lead to relatively poor power density and relatively poor MTBF and increased cost.

Figure 2:
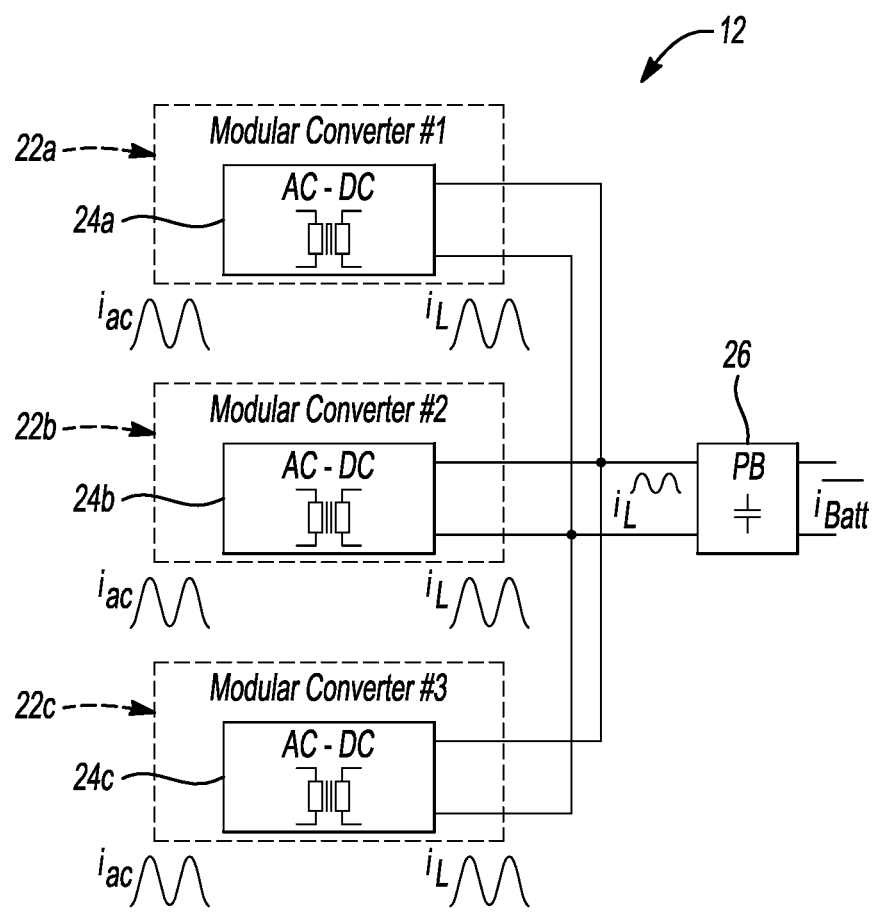
FIG. 2 depicts a block diagram of the OBC in which the OBC is a three-rail OBC.

Referring now to FIG. 2, with continual reference to FIG. 1, a block diagram of the OBC 12 is shown. The OBC 12 may be an n-phase OBC, where n is an integer of at least one. In the embodiment illustrated in FIG. 2, the OBC 12 may be a 3-phase OBC having first, second, and third rails 22a, 22b, and 22c.

The rails 22a, 22b, 22c may each include the same type of electrical circuitry in the form of a "modular converter" including an AC/DC converters 24a, 24b, 24c, respectively. Each AC/DC converter 24a, 24b, 24c is a single stage topology. Thus, unlike ordinary OBCs having a dual stage architecture including a PFC, a DC link capacitor, and a DC/DC converter for each rail, the OBC 12 may include a single stage architecture including an AC/DC converter for each rail 22a, 22b, 22c.

The OBC 12 further includes a pulsating buffer (PB) converter 26. The PB converter 26 is shared by AC/DC converters 24a, 24b, 24c. Particularly, the AC/DC converters 24a, 24b, 24c may be individually cascade-connected to the PB converter 26 as illustrated in FIG. 2. The AC/DC converters 24a, 24b, 24c are connectable at their respective input ends to the mains supply 16 and are connected at their respective output ends to the input end of PB converter 26. The output end of the PB converter 26 is connected to the traction battery 14. The AC/DC converters 24a, 24b, 24c together with the PB converter 26 function to convert electrical power from mains supply 16 into DC electrical power for charging traction battery 14. More particularly, the controller 20 controls the operation of the AC/DC converters 24a, 24b, 24c and the operation of the PB converter 26 according to control strategies for the OBC 12 to convert electrical power from the mains supply 16 into DC electrical power for charging the traction battery 14.

The AC/DC converters 24a, 24b, 24c include the same type of electrical circuitry and function the same. Thus, only the AC/DC converter 24a will be described in greater detail. In general, the AC/DC converter 24a includes a converter topology which neglects the use of a classical PFC and its associated inductor. The AC/DC converter 24a may be combined with the pulsating buffer (PB) converter 26 to maximize the use of an energy storage capacitor with the traction battery 14. This aspect may significantly reduce the capacitor size requirements.

In operation, the AC/DC converter 24a directly converts input AC from the mains supply 16 into a DC voltage and a positive oscillating current (i.e., "current ripple"). The input AC from the mains supply 16 is sinusoidal as understood. The output of AC/DC converter 24a is a DC voltage and a current ripple. The PB converter 26 post-processes the DC voltage and current ripple output of the AC/DC converter 24a to preferably eliminate or substantially eliminate (or minimize or at least reduce) the current ripple and transform the output of the AC/DC converter 24a into a battery level DC output.

Figure 3:
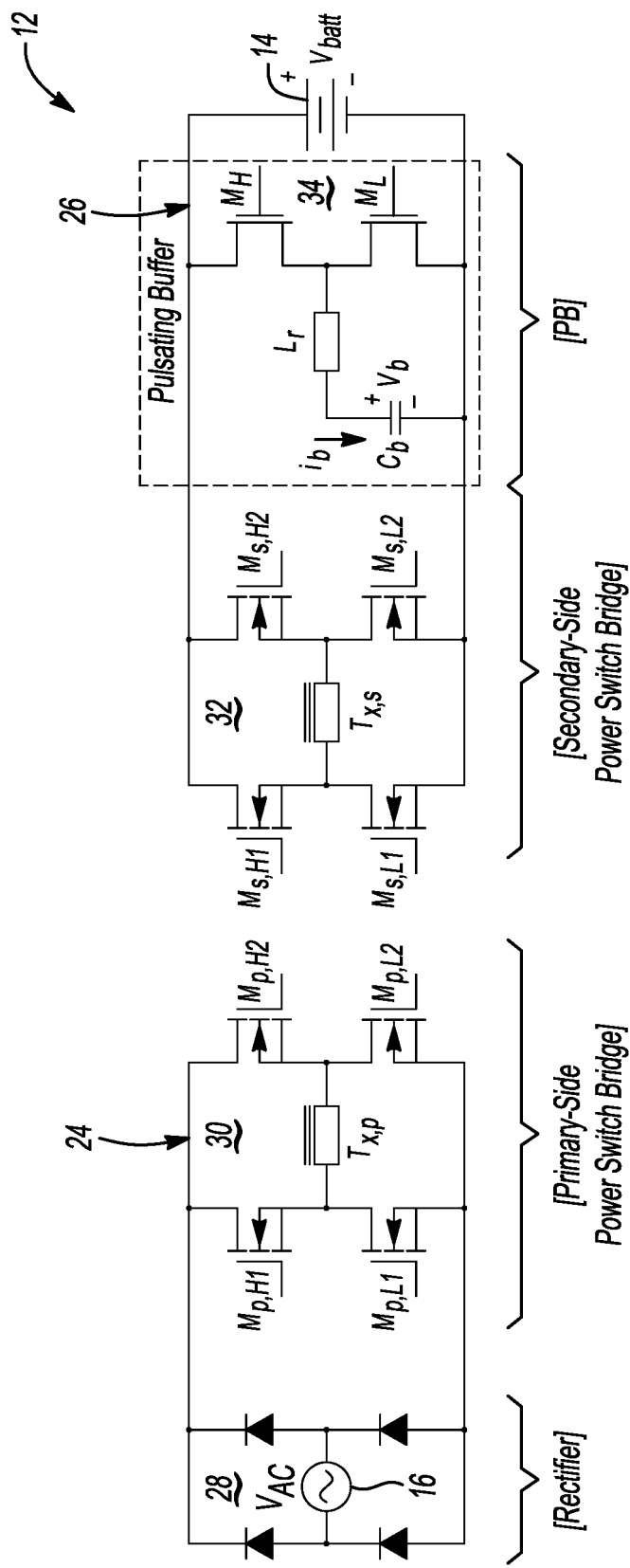
FIG. 3 depicts an electrical schematic diagram of the OBC in which the OBC is a single-rail OBC.

Referring now to FIG. 3, with continual reference to FIGS. 1 and 2, an electrical schematic diagram of the OBC 12 in which the OBC 12 is a single-rail OBC is shown. The depiction of the OBC 12 in FIG. 3 represents a single-rail direct OBC implementation (unidirectional). As shown in FIG. 3, the OBC 12 includes an AC/DC converter 24 and pulsating buffer (PB) converter 26. The AC/DC converter 24 is connected to the mains supply 16. The PB converter 26 is connected to the traction battery 14.

As further shown in FIG. 3, the AC/DC converter 24 includes a group of four diodes which form a full-bridge diode rectifier 28 at the front end of the AC/DC converter 24. The rectifier 28 is connected to the mains supply 16 to rectify the AC input for the AC/DC converter 24. The AC/DC converter 24 further includes a first group of four power switches which form a primary-side power switch bridge 30 on a primary-side of a transformer Tx. The AC/DC converter 24 further includes a second group of four power switches which form a secondary-side power switch bridge 32 on a secondary-side of the transformer Tx.

The AC/DC converter 24 with primary-side and secondary-side power switch bridges 30, 32 on respective sides of the transformer Tx includes a structure based on a dual-active bridge (DAB) topology. The controller 20 controls the power switch bridges 30, 32 to convert the rectified voltage that is inputted from the rectifier 28 into the DC voltage and current ripple output. The DC voltage and current ripple output is outputted from the AC/DC converter 24 to the PB converter 26.

As further shown in FIG. 3, the PB converter 26 includes a pair of power switches 34, an inductor Lr, and an energy storage capacitor Cb. The PB converter 26 thus has a current ripple processing based on pulsating buffer topology. The PB converter 26 receives the current ripple outputted from the AC/DC converter 24. The controller 20 controls the pair of power switches 34 to eliminate the current ripple and transform the output of AC/DC converter 24 into a battery level DC output for charging traction battery 14.

As shown in FIG. 3, the power switches of the primary-side and the secondary-side power switch bridges 30, 32 of AC/DC converter 24 and the power switches of the power switch pair 34 of PB converter 26 are MOSFETs.

In the OBC 12, only a single magnetic component, i.e., the transformer Tx, is in the in the center (or core) of the AC/DC converter 24. The PB converter 26 replaces the DC link capacitor compensation function of an ordinary OBC. The PB converter 26 compensates the current ripple outputted from the AC/DC converter 24 to the PB converter 26 to provide a smooth DC output voltage to significantly reduce the size of the energy storage capacitor Cb of the PB converter 26.

As indicated, the OBC 12 shown in FIG. 3 is unidirectional in that power flow from the mains supply 16 to the AC/DC converter 24 to the PB converter 26 to the traction battery 14. However, the OBC 12 can be bidirectional. For instance, the OBC 12 may be made bidirectional by replacing the diodes of rectifier 28 of AC/DC converter 24 with active switches, such as MOSFET switches to provide for a bidirectional rectifier. Consequently, the topology of OBC 12 can be implemented using a synchronous rectifier (bidirectional) enabling a bidirectional power flow: grid-to-vehicle (G2V) and vehicle-to-grid (V2G).

Figure 4:
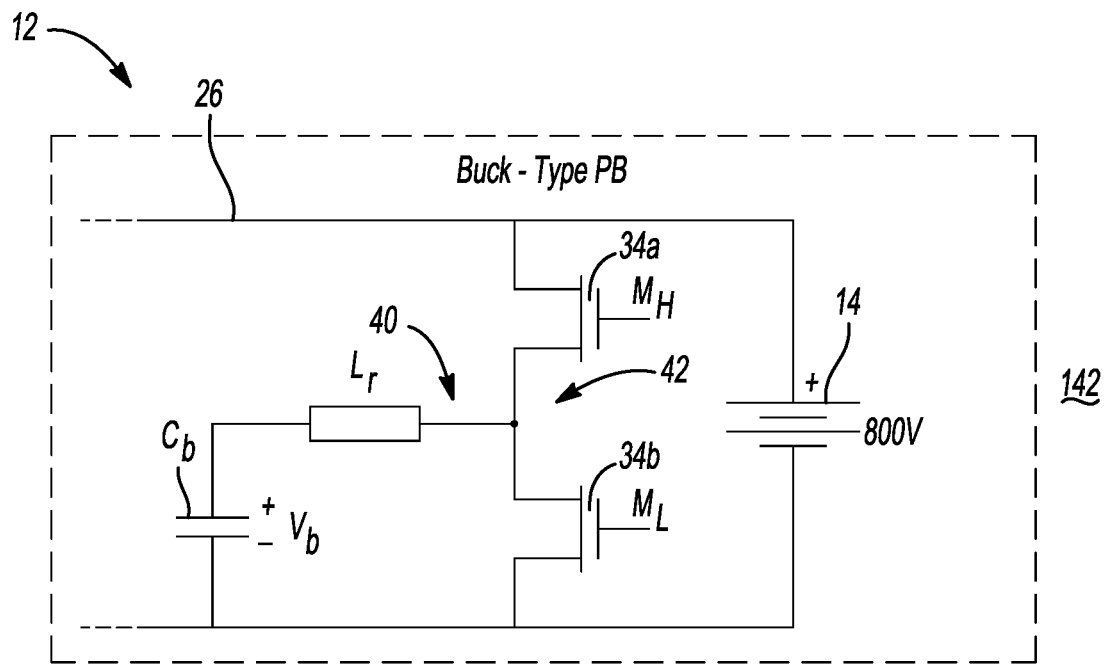
FIG. 4 depicts a more detailed example of a pulsating buffer (PB) converter shown in FIG. 3.

FIG. 4 depicts a more detailed example of the PB converter shown 26. In one example, the PB converter 26 may be implemented as a buck-type PB converter 26. In this case, the PB converter 26 may step down the DC voltage provided by one or more of the AC/DC converters 24a, 24b, 24c to the storage capacitor Cb.

As noted above, the PB converter 26 includes a plurality of power switches 34a and 34b, an inductor Lr, and an energy storage capacitor Cb. The PB converter 26 thus has a current ripple processing based on pulsating buffer topology. The PB converter 26 receives the current ripple outputted from the AC/DC converter 24. The controller 20 controls the power switches 34a, 34b to eliminate the current ripple and transform the output of AC/DC converter 24 into a battery level DC output for charging traction battery 14. The buck type PB converter 26 generally includes the capacitor Cb being in series with the inductor Lr thereby forming a first branch 40. The branch 40 is in parallel with the power switch 34b to form a second branch 42. The first switch 34a is in series the first branch 40 and the second branch 42. The layout or arrangement of the PB converter 26 as noted directly above yields an overall reduction of current handled by branch 40 at 400 Volts from approximately 61 A to approximately 31 A.

The PB converter 26 is connected in parallel between a secondary-side power switch bridge (not shown) and the high voltage battery 14. A first terminal of the first switch 34a connects to a node. In this node, Kirchoff law applies where I (power bridge) (e.g., current of the power bridge)+I (PB) (e.g., current of the PB converter 26)+ios=0. The same applies to a node formed between the power switch 34a, 34b and the inductor Lr. The current that flows to the capacitor Cb flows through the inductor Lr. $V_{o,s}$ is shared between the output of the power switch bridge (not shown), the PB converter 26, and the output battery.

The controller 20 controls the operation of pair of the power switches 34a, 34b of the PB converter 26 to draw a requisite amount of buffer current associated with a buffer voltage from capacitor Cb and generate therefrom a targeted, battery voltage/current. The targeted, battery voltage/current is output from the PB converter 26 to charge the traction battery 14. In general, the PB converter 26 is arranged to operate in the 800V domain 142 (e.g., 450-850 V) while at the same time utilize a reduced amount of current. For example, the OBC 12 may operate in the 800V domain.

Figure 5:
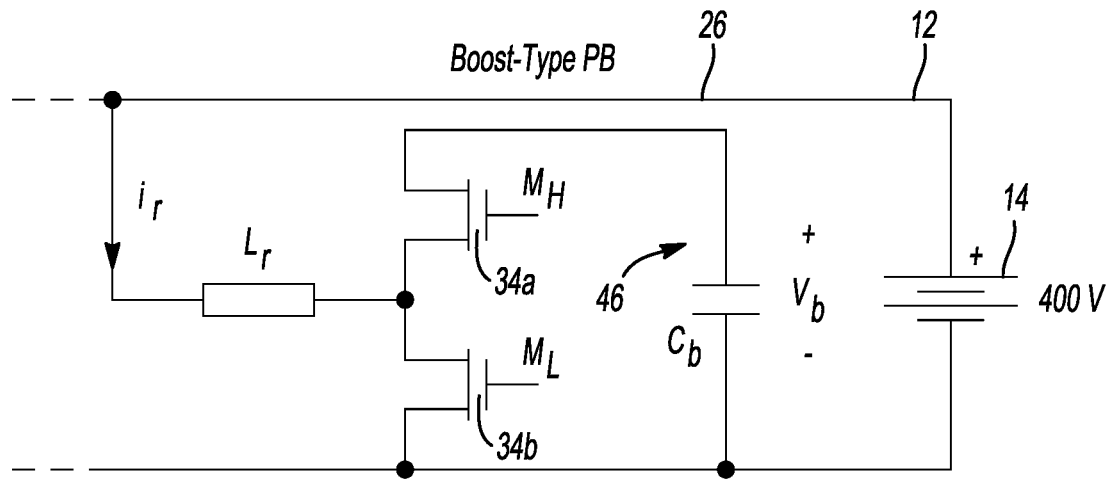
FIG. 5 depicts another PB converter.

FIG. 5 depicts another PB converter 12 in accordance with one embodiment. In one example, the PB converter 26 may be implemented as a boost-type PB converter 26. The PB converter 26 includes the plurality of power switches 34a and 34b, the inductor Lr, and the energy storage capacitor $C_b$. The boost type PB converter 26 includes the inductor Lr being in series with the power switch 34a and the power switch 34b. The switch 34a and the capacitor Cb are in series with one another and form a first branch 46. The branch 46 in parallel with the power switch 34b. The layout or arrangement of the PB converter 26 as noted directly above yields an overall reduction of current at 400 Volts to approximately 15 A.

The voltage at the capacitor $C_b$, may operate at a higher voltage and then with the same energy flow, at a lower current (see directly above). Such a lower current minimizes losses thereby increasing efficiency. For example, the energy stored in the inductance Lr is used to boost the voltage from the battery 14 to a higher voltage in the capacitor $C_b$. Consequently, due to the boost operation of the PB converter 26, the voltage of the capacitor $C_b$, may be higher than the voltage of the battery 14. This high voltage operation may ensure a low current through the PB converter 26 and, consequently, highly efficient operation. The PB converter 26 may reduce current levels for a 400V OBC variant. In general, the PB converter 26 in the boost mode entails a high voltage at the capacitor $C_b$, and for power devices. The PB converter 26 may be more suited for 400-V batteries rather than 800-V batteries.

Figure 6A:
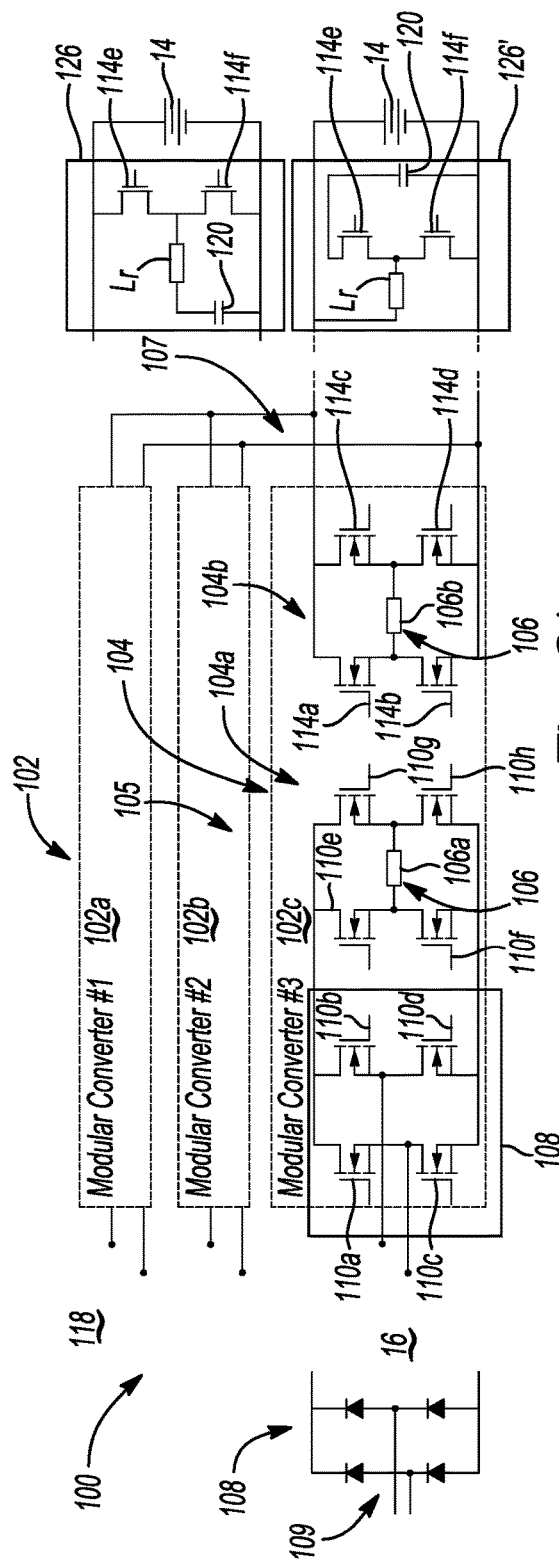
FIG. 6A depicts a system including a Dual Active Bridge (DAB) stage coupled with a transformer to interface with a separate rectifier.

FIG. 6A depicts a system 100 formed by modular converters 102 (or modular converters 102a-102c) with each modular converter 102 having dual active bridge (DAB) stages 104a, 104b in accordance with one embodiment. Each modular converter 102 is configured to receive a three-phase signal (e.g., Line 1, Line 2, Line 3, and Neutral inputs from mains supply 16) The modular converter 102 includes a transformer 106 having a primary winding of the transformer 106a (e.g., primary side of transformer 106), a secondary winding of the transformer 106b (e.g., secondary side of transformer 106), and a rectifier 108. The rectifier 108 is formed of a full bridge diode network 109 or a rectifier 108 that is formed of a full bridge switching circuit formed by switches 110a-110d. A controller 118 may control the switching states of the switches 110a-110d of the rectifier 108. For example, in the event the converter 102 includes the rectifier 108 that is formed of the diode network 109, such a diode network 109 is not part of the DAB stage 104a and the rectifier 108 enables unidirectional power transfer. Conversely, in the event the converter 102 includes the rectifier 108 that is formed of by the switches 110a-110d, such switches 110a-110d enable bi-directional power transfer. FIG. 6A also illustrates a first PB converter 126 and a second PB converter 126'. It is recognized that system 100 may include either the first PB converter 126 or the second PB converter 126'.

The first PB converter 126 includes a capacitor 120, switches 114e-114f, and the inductor Lr. The second PB converter 126' includes the capacitors, the switches 114e-114f, and the inductor Lr. The first PB converter 126 or the second PB converter 126' cooperates with the DAB stage 104b to convert energy for storage. The selection of whether the first PB converter 126 or the second PB converter 126' is implemented depends on the output voltage that is desired to be stored on the battery 14. The DAB stage 104a includes switches 110e-110h that are operably coupled to the primary winding of transformer 106a. The DAB stage 104b includes switches 114a-114d that are operably coupled to the secondary winding of the transformer 106b.

Figure 6B:
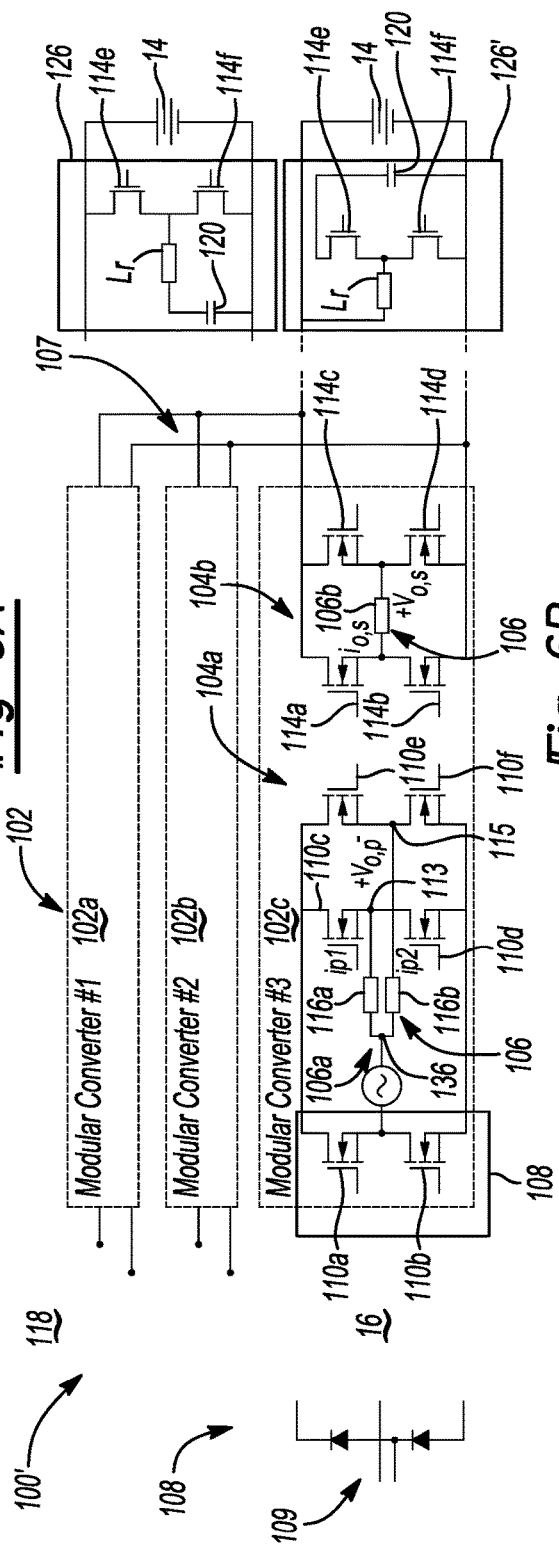
FIG. 6B depicts another system including the DAB stage coupled with a transformer to interface with a rectifier integration in accordance with one embodiment.

FIG. 6B depicts a system 100' formed by modular converters 102 (or 102a-120c) with dual active bridge (DAB) stages 104a, 104b in accordance with one embodiment. The system 100' is generally similar to the system 100 of FIG. 6A. However, there are some differences. For example, the diode network 109 in the system 100' is implemented as a half bridge diode network (the diode network 109 in the system 100 is implemented as a full bridge diode network). As noted above, in the event the system 100' includes the rectifier 108 that is formed of the diode network 109, such a diode network 109 is part of the DAB stage 104a and the primary windings of the transformer 106 and enables unidirectional power transfer. Also, in the event the system 100' includes the rectifier 108 that is formed of by the switches 110a-110b, such switches 110a-110b (i.e., the rectifier 108) is integrated (or combined) with the DAB stage 104a and the primary windings of the transformer 106 and enables bi-directional power transfer. It is recognized that system 100' may include either the first PB converter 126 or the second PB converter 126'.

The DAB stage 104a includes switches 110c-110f that are operably coupled to a first point (or top point) 113 and a second point (or bottom point) 115 of the primary transformer 106a. The primary transformer 106a includes two windings 116a and 116b (or first winding 116a and second winding 116b). The two windings 116a-116b form a middle point 136 for the transformer 106. The middle point 136 of the transformer 106 is coupled to directly to the mains supply 16 (or Vac as depicted as an AC voltage source (Vac) in FIG. 6B). AC current is split into the two windings 116a-116b as two counterphase signals to minimize EMI interference to the grid. In other words, the two windings 116a-116b minimize EMI interference to the grid by providing the two signals that are of an opposite phase of one another (or 180 degrees out of phase with one another). The formation of the middle point 136 enables for an interleaved control strategy which will be discussed in more detail below. The formation of the middle point 136 also enables the switches 110c-110f of the DAB stage 104a to double its corresponding voltage output while at the same time reduce current output by as much as 50% over previous implementations. The DAB stages 104a reduces current with a reduced number of switches 110a-110b (e.g., half bridge) when compared to the switches 110a-110d (e.g., full bridge) of the rectifier 108. Such a reduction in current leads to an overall improvement in mitigating losses. While higher rated voltage components may be required for the switches 110a-110f (e.g., SiC) which may also provide sub-optimal performance for resistance for the switches 110a-110f, this implementation may still be more efficient as current is reduced. This implementation may be more cost effective than a standalone rectifier and also eliminates extra devices for surge protection. A secondary side of the transformer 106b provides the voltage $V_{o,s}$.

As noted above, the middle point 136 of the transformer 106 is coupled to Vac and provides an AC based current (e.g., $i_{ac}$) to the middle point 136 and to each of the first and second windings 116a-116b. The first winding 116a provides a current $i_{p1}$ and the second winding 116b provides a current $i_{p2}$. The voltage of the transformer (e.g., $V_{o,p}$) may be at least two times the peak of Vac due to the presence of the middle point 136 connection of the transformer 106 (e.g., the presence of the first winding 116a and the second winding 116b). At the DAB stage 104a, the switches 110c-110f are half-cycled by the controller 118 such that the first winding 116a and the second winding 116b are provided with Vac (voltage from the mains supply 16). Thus, in this regard, the transformer 106 doubles the Vac to provide $V_{o,p}$ (which is twice the amount of a peak of Vac). Additionally, at the same power transfer, half of the current (or Iac) of the mains supply 16) is processed in each the first winding 116a and the second winding 116b (i.e., $i_{p1}$ and $i_{p2}$ are each half of Iac) when compared to a rectifier application that is separate from the rest of the system (i.e., a non-integrated rectifier implementation). It is recognized that the current (e.g., $i_{p1}$ and $i_{p2}$) of the first and second windings 116a and 116b respectively, are opposed to one another (or 180 degrees phase shifted from one another) when compared to standalone rectifier applications. This is attributed to the controller 118 employing an alternate switching cycle for the switches 110c-110f. Both the voltage and current at the DAB stage 104a are positive and negative which differs from previous implementations. The controller 118 generally sets a switching duty cycle that is fixed to 0.5 for the switches 110c-110f of the DAB stage 104a and for the switches 114a-114f of the DAB stage 104b.

The controller 118 generally controls the switches 110a-110b (e.g., half bridge) alternatively (e.g., at half cycles of, for example, 50 or 60 Hz). For example, assuming, energy from the grid (or main supply 16) is positive, then the controller 118 activates the switch 110b and deactivates the switch 110a to provide a positive rectified output to the DAB stage 104a. Assuming that the energy from the grid (or mains supply 16) is negative, then the controller 118 activates the switch 110a and deactivates the switch 110b to provide a positive rectified output to the DAB stage 104a. The middle point 136 also enables the system 100' to achieve a zero-input ripple (e.g., 180 degrees phase cancelation) which provides for a simplified AC input filter (not shown).

As noted above, the first PB converter 126 or the second PB converter 126' is cascaded from a functional perspective with the DAB stage 104b. The selection of whether the first PB converter 126 or the second PB converter 126' is implemented depends on the output voltage that is desired to be stored on the battery 14. The DAB stage 104a includes switches 110c-110f that are operably coupled to the primary transformer 106a. The DAB stage 104b includes switches 114a-114d that are operably coupled to the secondary transformer 106b.

As shown, the system 100' generally provides for a reduction in the number of switches (e.g., a total of 6 switches) in comparison to the total of 8 switches as shown in connection with FIG. 6A and results in the achievement of higher efficiency. In addition, the system 100' provides bi-directional features by replacing diodes with various the switching devices 110a-110b. The system 100' as illustrated in FIG. 6B provides an input rectifier 108 or 109 combined with primary full bridge (e.g. the DAB stage 104a), and transformer primary 106a (e.g., with two windings and the middle point 136). The PB converter, 126 (or 126') is separate from the secondary full bridge (e.g. the DAB stage 104b).

Figure 7:
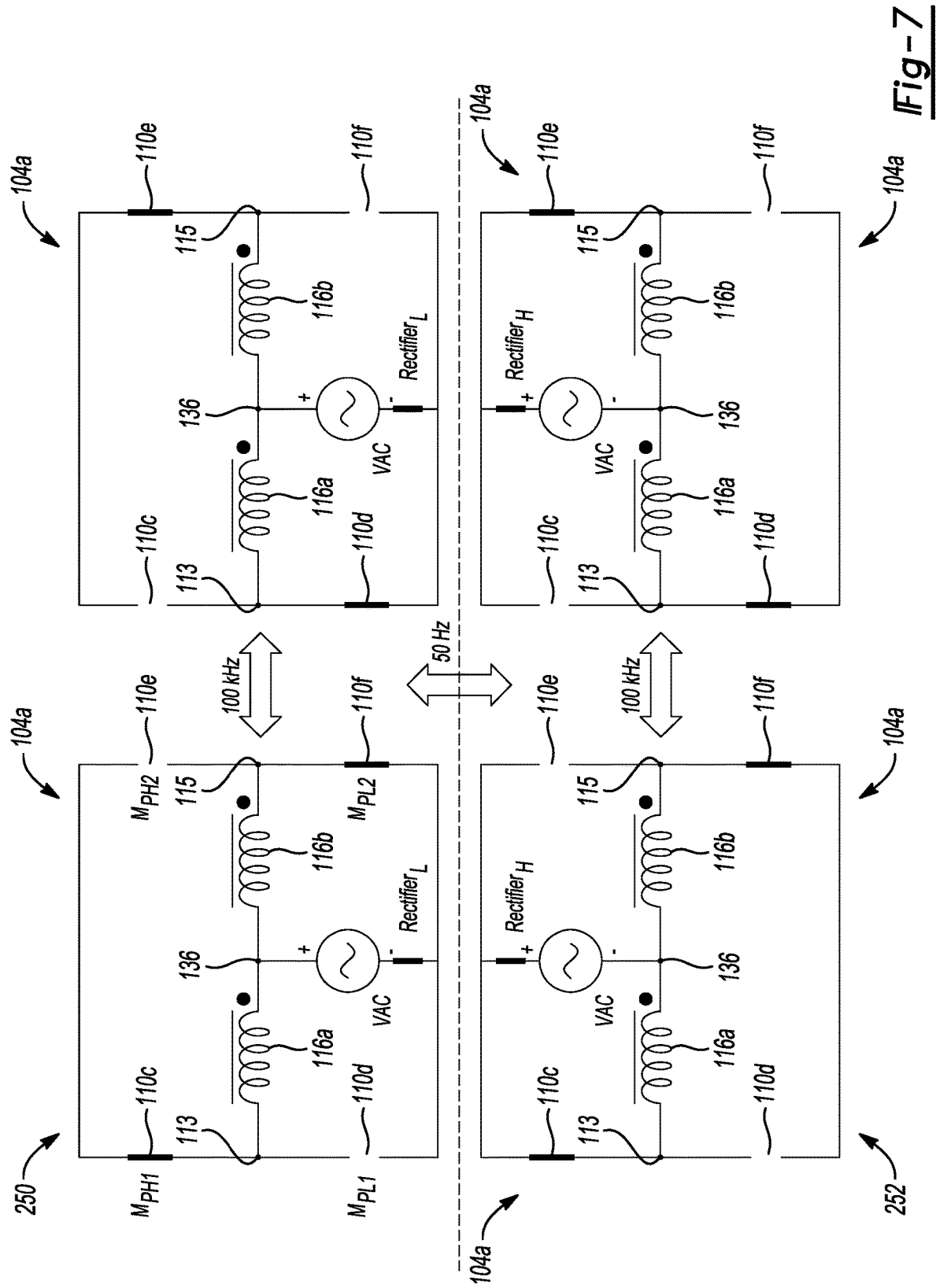
FIG. 7 depicts a first AC positive half cycle for the of the primary stage of FIG. 6B and a second AC negative half cycle for the primary stage of FIG. 6B in accordance with one embodiment.

FIG. 7 depicts an AC positive half cycle 250 applied to the switches 110c-110f of the DAB stage 104a (e.g., as applied by the controller 118) of FIG. 6B and an AC negative half cycle 252 for the DAB stage 104b (e.g., as applied by the controller 118) of FIG. 6B in accordance with one embodiment. Referring to the AC positive half cycle 250 of Vac (or the AC voltage of the mains supply 18), the controller 118 activates the switches 110c and 110f while deactivating the switches 110d and 110e (see upper left circuit in FIG. 7). In this case, the switch 110b of the rectifier 108 may be "ON" (e.g., "rectifier$_L$") and the switch 110a of the rectifier 108 may be "OFF" when the AC positive half cycle 250 of the mains supply 18 is applied to the DAB stage 104a. Similarly, referring to the AC positive half cycle 250 of Vac (or the AC voltage of the mains supply 16, the controller 118 deactivates the switches 110c and 110f while activating the switches 110d and 110e (see upper right circuit in FIG. 7). In this case, the switch 110b of the rectifier 108 may be "ON" (e.g., "rectifier$_L$") and the switch 110a of the rectifier 108 may be "OFF" when the AC positive half cycle 205 of the mains supply 18 is applied to the DAB stage 104a. The controller 118 selectively activates/deactivates the switches 110c-110f at a switching frequency of, for example, 100 KHz. The frequency of the Vac as provided by the mains supply 16 may be, for example, 50 Hz. FIG. 7 generally depicts the operation of the different switches (or MOSFETs) 110c-110f and the alternate low-speed switching of the switches (or MOSFETs) 110a-110b.

Referring to the AC negative half cycle 252 of Vac (or the AC voltage of the mains supply 18), the controller 118 activates the switches 110c and 110f while deactivating the switches 110d and 110e (see lower left circuit in FIG. 7). In this case, the switch 110a of the rectifier 108 may be "ON" (e.g., "rectifier$_H$") and the switch 110b of the rectifier 108 may be "OFF" when the AC positive half cycle 205 of the mains supply 18 is applied to the DAB stage 104a. Similarly, referring to the AC negative half cycle 250 of Vac (or the AC voltage of the mains supply 18), the controller 118 deactivates the switches 110c and 110f while activating the switches 110d and 110e (see lower right circuit in FIG. 7). In this case also, the switch 110a of the rectifier 108 may be "ON" (e.g., "rectifier$_H$") and the switch 110b of the rectifier 108 may be "OFF" when the AC negative half cycle 205 of the mains supply 18 is applied to the DAB stage 104a. The controller 118 selectively activates/deactivates the switches 110c-110f at a switching frequency of, for example, 100 KHz. The frequency of the Vac as provided by the mains supply 16 may be, for example, 50 Hz.

In general, FIG. 7 illustrates that the rectifier 108 (e.g., a half bridge rectifier with either two diodes 109 or two switches 110a-110b) is activated in response to receiving the AC input from the main supply 18. Once activated and depending on the phase of the AC input, the rectifier 108 is either high or low and corresponding switches 110c-110f of the DAB stage 104a directly receive the AC input from the mains supply 18. As shown, the rectifier 108 behaves similarly to a switch, and when activated based on the phase of the AC input, enables the switches 110c-110f to directly receive the AC input from the mains supply 18. Similarly, the rectifier 108, when activated, based on the phase of the AC input, enables the first winding 116a, the second winding 116b, and the middle point 136 to directly receive the AC input from the mains supply 18. As also shown, the switches 110c-110f directly receive first and second signals from the first winding 116a and the second winding 116b and thereby reduce EMI due to the phase shift in the first and second signals.

Figure 8:
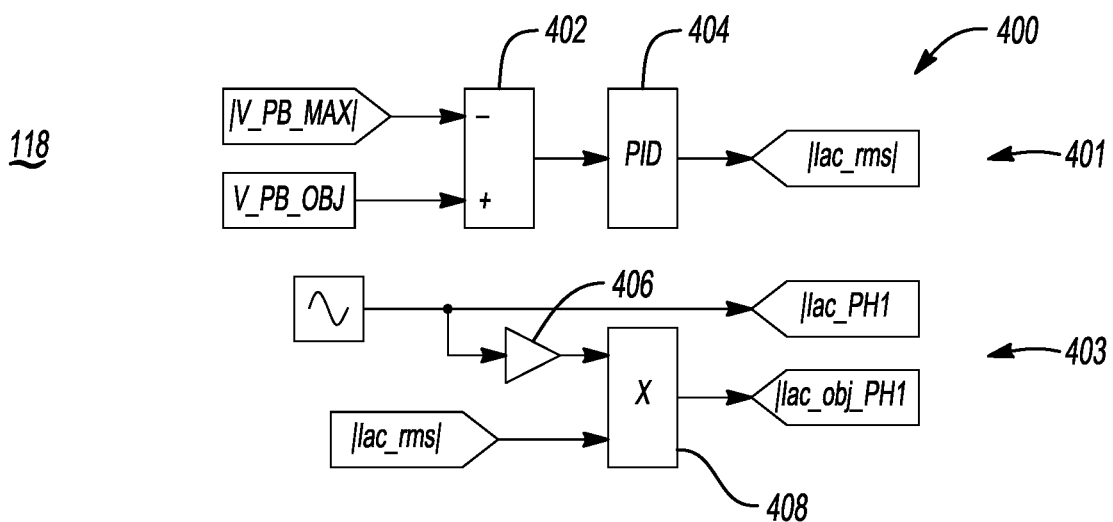
FIG. 8 depicts various control blocks implemented within a controller of the OBC in accordance with one embodiment.

FIG. 8 depicts a first control block 400 positioned within the controller 118 in accordance with one embodiment. The controller 118 utilizes the first control block 400 to control various aspects of the apparatus 100'. These aspects will be discussed in more detail below. The first control block 400 includes a first portion 401 and a second portion 403. The first portion 401 includes an adder 402 and a proportional, integral, derivative (PID) controller 404. The controller 118 determines a maximum peak voltage of the PB converter 26 (e.g., V_PB_max) and provides the same to the adder 402. The maximum peak voltage of the PB converter 126 or 126' generally corresponds to the maximum voltage at the capacitor 120. It is recognized that one or more voltage sensors (not shown) may be positioned about the PB converter 126 or 126' to provide the maximum peak voltage of the PB converter 126 or 126' (e.g., the voltage across the capacitor 120). The controller 118 is operably coupled to the one or more voltage sensors to provide the maximum peak voltage of the PB converter 126 or 126'. The controller 118 also provides a maximum voltage that is allowed to be stored on the capacitor 110 of the PB converter 126 (e.g., V_PB_OBJ) to the adder 402. V_PB_OBJ is a design parameter based on the selected pulsating buffer capacitor 120. For example, V_PB_OBJ is the maximum voltage by design the secondary side 107 can operate (e.g., 950V) (the capacitor 120 where the typical voltage is 1100V)). V_PB_MAX is variable, obtained from the capacitor 120 max peak voltage). V_PB_OBJ is selected to optimize the operating conditions for the apparatus 100' to optimize the cost for the capacitor 120 considering its technology and maximum voltage. Generally, the value for V_PB_OBJ is pre-stored in the controller 118. The adder 402 subtracts V_PB_max from V_PB_OBJ and provides a difference between V_PB_max from V_PB_OBJ to the PID controller 406. The PID controller 404 generates a desired root mean square value of the current input (e.g., Iac_Rms) which later corresponds to a desired input current request for the driving the switches 110 and 114 after operations are performed on the second portion 403 and a first control portion 451 (see below) that provides control parameter FI on the primary and the secondary sides 105, 107 of the apparatus 100' (e.g., power plant).

Figure 9:
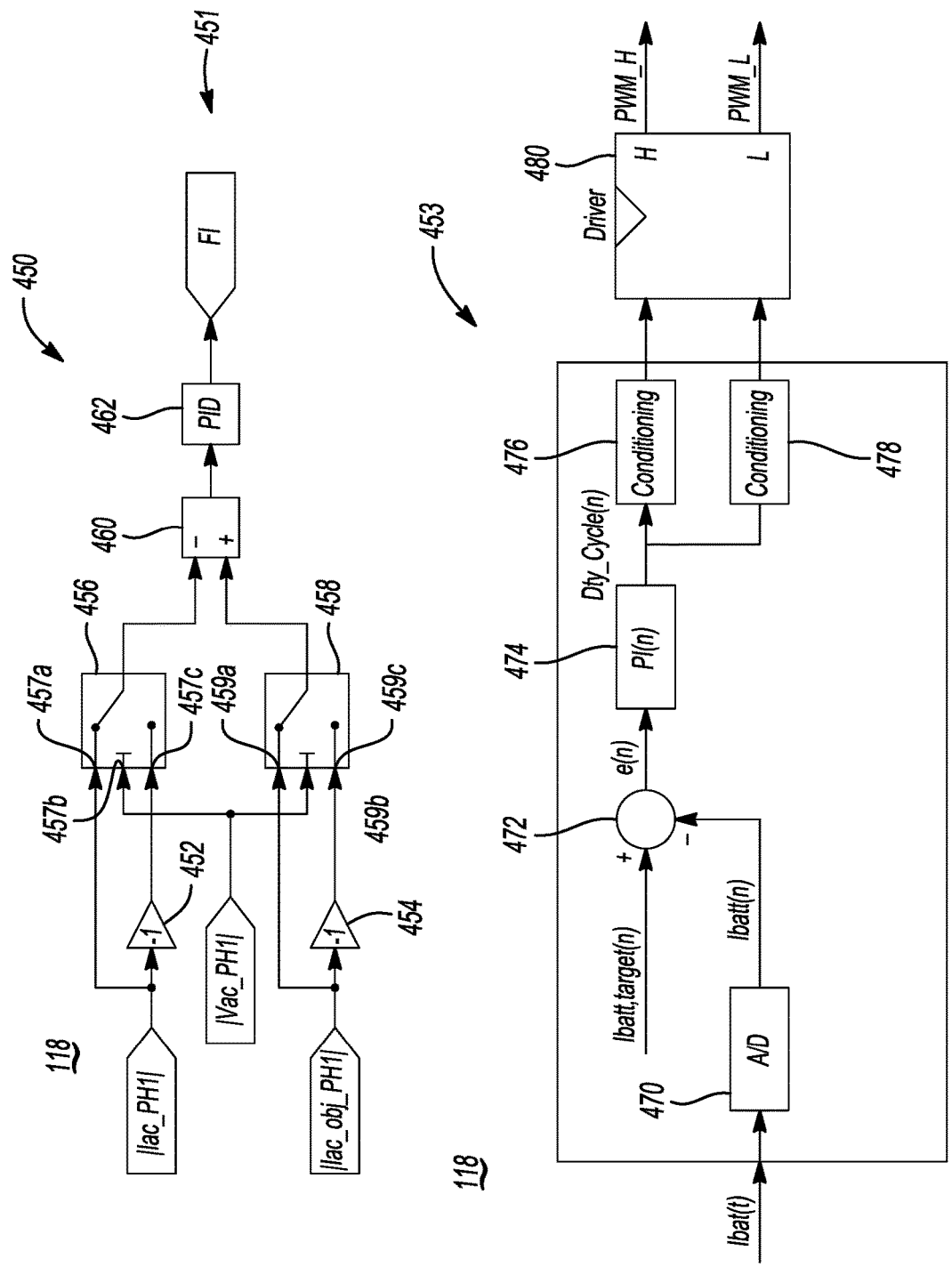
FIG. 9 depicts additional various control blocks implemented within the controller in accordance with one embodiment.

The second portion 403 of the first control block 400 includes a gain circuit 406 and a multiplier circuit 408. An oscillating waveform (e.g., sine wave) is provided to the gain circuit 406 and to the multiplier circuit 408. The multiplier circuit 408 multiplies the oscillating waveform with the desired Rms current input (e.g., Iac_Rms) as generated by the PID controller 404 to generate a transformed Iac_Rms current (or Iac_Obj_PH1 where PH1 corresponds to Line 1). This is performed for each of the converters 102a-102n in the system 100'. It is recognized that the operations as set forth and performed in connection with FIGS. 8-9 are performed for each converter 102. The first control block 400 provides the AC current to the power plant when the apparatus 100' is discharging current (i.e., the battery 14 is providing power back to the grid (or main supply 16)) and provides Iac_Obj_PH1 to the power plant when the apparatus 100' is charging current to the battery 14.

FIG. 9 depicts a second control block 450 positioned within the controller 118 in accordance with one embodiment. The implementation of the second control block 450 (e.g., only the first portion 451) in addition to the architectures as set forth in FIGS. 6B, and 8 are also disclosed in co-pending U.S. application Ser. No. 17/335,661, entitled "APPARATUS FOR SINGLE STAGE ON-BOARD CHARGER WITH AN INTEGRATED PULSATING BUFFER CONTROL" filed on Jun. 1, 2021, the disclosure of which is hereby incorporated by reference in its entirety. The second control block 450 includes a first portion 451 and a second portion 453. The first portion 451 includes a first gain circuit 452, a second gain circuit 454, a first multiplexer circuit 456, a second multiplexer circuit 458, a first comparator 460, and a first PID controller 462. The first multiplexer 456 includes inputs 457a-457c and the second multiplexer includes inputs 459a-459c. The first gain circuit 452 receives Iac_PH1 which corresponds to a measured AC current in Line 1.

In the event, Iac_PH1 is positive, this signal is passed to the first input 457a of the first multiplexer circuit 456. In the event, Iac_PH1 is negative, this signal is passed to the first gain circuit 452 where it is multiplied with a negative unity value. Vac_PH1 generally represents a voltage that indicates when to select the input 457a or 459a (e.g., when Vac_PH1 is positive) or the input 457c or 459c (e.g., when Vac_PH1 is negative). The output of the first gain circuit 452 (e.g., a positive Iac_PH1) is then transmitted to the third input 457c of the first multiplexer 456. The first comparator 460 compares the outputs from the first and the second multiplexers 456, 458 (e.g., Iac_PH1 and Iac_Obj_PH1) to one another. If the comparator 406 provides a difference from the outputs of the multiplexers 456, 458; the first PID controller 462 applies a compensation factor and generates a signal or parameter, FI which corresponds to a power plant operation variable. The variable FI corresponds to a phase shift between a control signal (e.g., primary control signal) for activating/deactivating the switches 110 on the primary side 104a and a control signal (e.g., secondary control signal) for activating/deactivating the switches 114 on the secondary side 104b.

Referring back to FIG. 9, in a similar fashion, Iac_Obj_PH1 is transmitted to the first input 459a of the second multiplexer 458. As noted in connection with FIG. 8, Iac_Obj_PH1 is provided (or generated) by the second portion 403 of the first control block 403. In the event, Iac_Obj_PH1 is positive, this signal or parameter is passed to the first input 459a of the second multiplexer circuit 458. In the event, Iac_Obj_PH1 is negative, this signal or parameter is passed to the second gain circuit 454 where Iac_Obj_PH1 is multiplied with a negative unity value. The output of the first gain circuit 452 (e.g., a positive Iac_PH1) is then transmitted to the third input 459c of the first multiplexer 456.

The second portion 453 includes an analog digital (A/D) converter 470, an adder circuit 472, a first PI controller 474, a first conditioning block 476, a second conditioning block 478, and a driver 480. In general, the second portion 453 provides control signals to the driver 480. In turn, the driver 480 generates a PWM_H signal or a PWM_L signal which is used to drive the switches 114e and/or 114f in connection with the PB converter 126' as set forth in FIG. 6B. One example of the second portion 453 is set forth in the '398 application as set forth above.

In operation, a measured current across the HV battery 14 (e.g., ibatt(t)) (not shown) is provided to the A/D converter 470 as an analog signal. The A/D converter 470 converts the analog signal into a digital output (Ibatt(n)). The adder circuit 472 subtracts Ibatt(n) from a digital version a charging target current (Ibatt) for charging the battery 14 (or Ibatt, target(n)) and generates an error signal, e(n). The first PI controller 474 processes the error signal, e(n) and generates a signal Dty_Cycle(n) which corresponds to a switching duty cycle. The first PI controller 474 forms a feedback loop that calculates the error signal e(n) based on the different between the setpoint (or Ibatt, target (n)) and the ibatt(n) (i.e., the measure HV battery current). The first conditioning block 476 and the second conditioning block 478 processes the signal Dty_Cycle(n) prior to providing the duty cycle to the driver 480. In general, the first and second conditioning blocks 476 and 478 convert the output of the first PI controller 474 in clock tick counts (e.g., frequency for a duty cycle for the driver 480 which manages the switches 114e-114f of the PB converter 126 or 126' of FIG. 6B).

Figure 10:
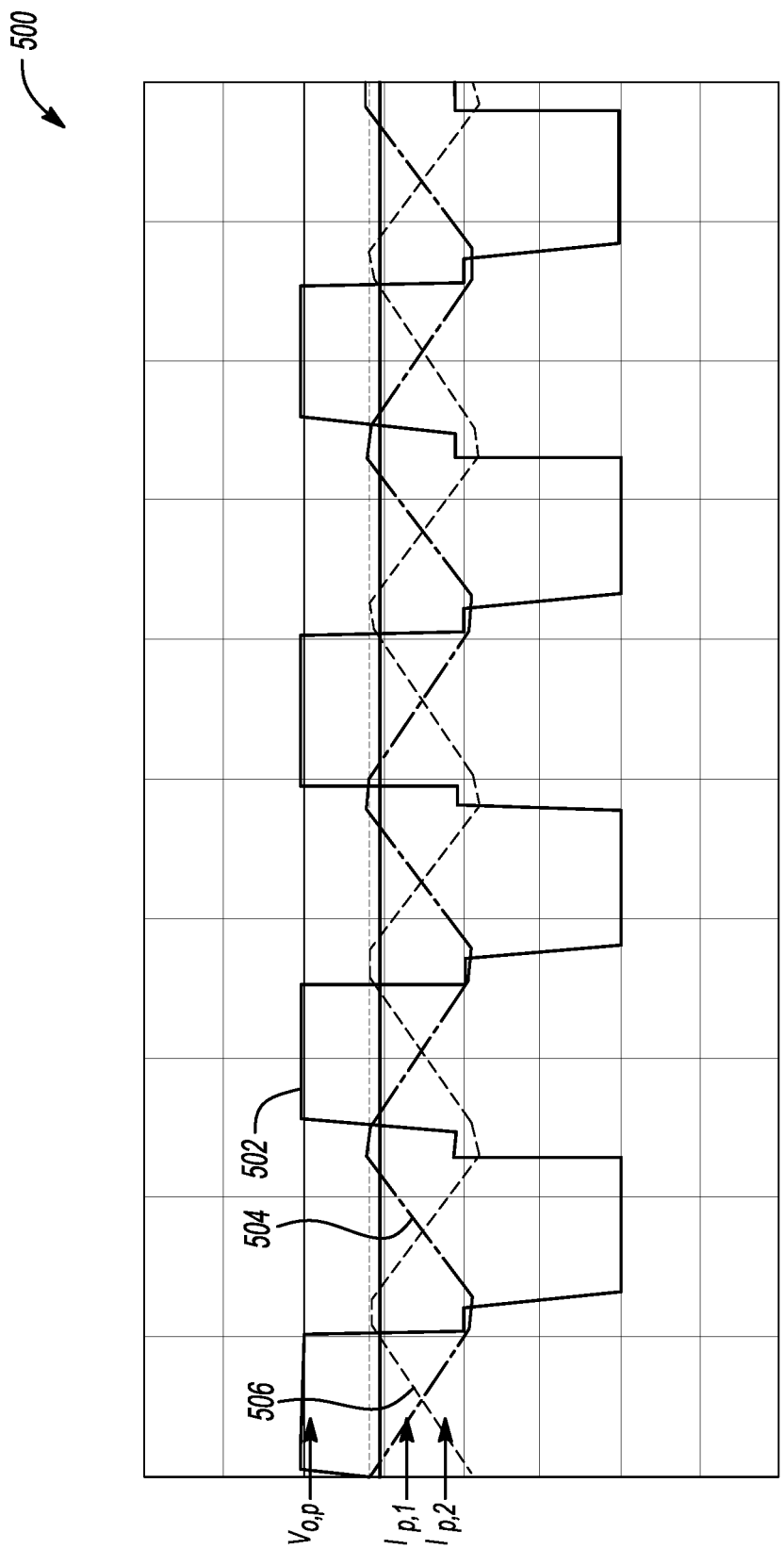
FIG. 10 depicts a plot including waveforms of a voltage output across a primary transformer ($V_{o,p}$), a current across a first coil of the primary transformer ($i_{p1}$), and a current across a second coil of the primary transformer ($i_{p2}$) in accordance with one embodiment.

FIG. 10 depicts a plot 500 including a waveform 502 for the voltage output across the primary transformer 106a ($V_{o,p}$), a waveform 504 for the current across a first winding 116a of the primary transformer 106a ($i_{p1}$), and a waveform 506 for the current across the second winding 116b of the primary transformer 106a ($i_{p2}$) in accordance with one embodiment. As noted above in connection with FIG. 6B, the voltage at the output of the DAB stage 104a (or $V_{o,p}$) is doubled due to the presence of the middle point 136 of the transformer 106 (or due to the first and second windings 116a, 116b). This provides the benefits of increased efficiency (e.g., due to lower currents flowing through the full bridge switches (e.g., switches 110c-110f) and increased EMC performance due to interleaving where each half bridge (e.g., switches 110c and 110f and switches 110d and 110e) is 180 degrees with respect to the other. As noted above, the control strategy for the switches 110c-110f of the DAB stage 104a and the switches 114a-114d of the DAB stage 104b is provided via the control variable F1. The overall control of the PB converter 126, 126' may not be affected.

FIG. 11 depicts a plot 600 including a waveform 602 for the voltage output across the primary transformer 106a ($V_{o,p}$), a waveform 603 for the voltage output across the secondary transformer 106b ($V_{o,s}$), and a waveform 604 for the current across a first winding 116a of the primary transformer 106a ($i_{p1}$). At 606, the control variable FI is illustrated which corresponds to a phase shift between the waveforms 602 and 603 in accordance with one embodiment. FIG. 11 generally provides more details of the switching (e.g., of the switches 110c-110f) at a Vac high value (e.g., Vac is nearly the peak value) with a maximum $V_{o,p}$ peak value, and a maximum FI value.

FIG. 12 depicts a plot 700 including a waveform 702 for the voltage output across the primary transformer 106 ($V_{o,p}$), a waveform 703 for the voltage output across the secondary transformer 106b ($V_{o,s}$), a waveform 704 for the current across a first winding 116a of the primary transformer 106 ($i_{p1}$). At 706, the control variable FI is illustrated which corresponds to a phase shift between the waveforms 702 and 703 in accordance with one embodiment. The waveform 702 for the voltage output across the voltage output of the primary transformer 106a ($V_{o,p}$) is shown to be lower than the waveform 602 for the voltage output of the primary transformer 106 ($V_{o,p}$) as shown in connection with FIG. 11. FIG. 12 generally provides more details of the switching (e.g., of the switches 110c-110f) with a minimum $V_{o,p}$ peak value, and a minimum FI value.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle battery charger comprising:
at least one transformer having a first winding and a second winding on a primary side of the at least one transformer that are connected to one another to form a middle point, the middle point of the at least one transformer for receiving an input voltage signal from a mains supply;
a half-bridge rectifier for receiving the input voltage signal from the mains supply to enable the middle point of the at least one transformer to receive the input voltage signal from the mains supply; and
a first active bridge including a first plurality of switching devices to receive a first input signal directly from the first winding and to receive a second input signal directly from the second winding, wherein the first input signal and the second input signal are out of phase with one another to reduce electromagnetic interference (EMI) within the vehicle battery charger.

2. The vehicle battery charger of claim 1, wherein the first input signal and the second input signal are 180 degrees out of phase from one another.

3. The vehicle battery charge of claim 1, wherein the half-bridge rectifier enables uni-directional energy transfer from the mains supply to a vehicle battery.

4. The vehicle battery charger of claim 3, wherein the half-bridge rectifier includes a plurality of diodes for enabling the uni-directional energy transfer from the main supply to the vehicle battery.

5. The vehicle battery charger of claim 1, wherein the half-bridge rectifier enables bi-directional energy transfer from the mains supply to the vehicle battery and from the vehicle battery to the mains supply.

6. The vehicle battery charger of claim 5, wherein the half-bridge rectifier includes a plurality of switches for enabling the bi-directional energy transfer from the mains supply to the vehicle battery and from the vehicle battery to the mains supply.

7. The vehicle battery charger of claim 1, wherein the first plurality of switching devices of first active bridge to generate a first voltage signal based on the first input signal and the second input signal.

8. The vehicle battery charger of claim 7 further comprising a second active bridge including a second plurality of switching devices being positioned on a secondary side of the charger to generate a second voltage signal in response to the first voltage signal.

9. The vehicle battery charger of claim 8 further comprising at least one controller configured to:

selectively activate the first plurality of switching devices based on a primary control signal to generate the first voltage signal in response to the input voltage signal; and selectively activate the second plurality of switching devices based on a secondary control signal to generate the second voltage signal.

10. The vehicle battery charge of claim 9 wherein the at least one controller is further configured to generate a control variable that corresponds to a phase shift between the primary control signal and the secondary control signal, wherein the control variable enables the at least one controller to transfer power between the first active bridge and the second active bridge.

11. A vehicle battery charger comprising:
at least one transformer having a first winding and a second winding on a primary side of the at least one transformer that are connected to one another to form a middle point, the middle point of the at least one transformer for receiving an input voltage signal from a mains supply that is external to the vehicle battery charger;
a half-bridge rectifier for receiving the input voltage signal from the mains supply to enable the middle point of the least one transformer to receive the input voltage signal from the mains supply; and
a first active bridge including a first plurality of switching devices to receive a first input signal directly from at least the first winding and to receive a second input signal directly from at least the second winding, wherein the first input signal and the second input signal are out of phase with one another to minimize electromagnetic interference (EMI) within the vehicle battery charger.

12. The vehicle battery charge of claim 11, wherein the rectifier enables uni-directional energy transfer from the mains supply to a vehicle battery.

13. The vehicle battery charger of claim 11, wherein the half-bridge rectifier includes a plurality of diodes for enabling the uni-directional energy transfer from the main supply to the vehicle battery.

14. The vehicle battery charger of claim 11, wherein the half-bridge rectifier enables bi-directional energy transfer from the mains supply to the vehicle battery and from the vehicle battery to the mains supply.

15. The vehicle battery charger of claim 14, wherein the half-bridge rectifier includes a plurality of switches for enabling the bi-directional energy transfer from the mains supply to the vehicle battery and from the vehicle battery to the mains supply.

16. The vehicle battery charger of claim 11, wherein the first plurality of switching devices of first active bridge to generate a first voltage signal based on the first input signal and the second input signal.

17. The vehicle battery charger of claim 16 further comprising a second active bridge including a second plurality of switching devices being positioned on a secondary side of the vehicle battery charger to generate a second voltage signal in response to the first voltage signal.

18. The vehicle battery charger of claim 17 further comprising at least one controller configured to:
selectively activate the first plurality of switching devices based on a primary control signal to generate the first voltage signal in response to the input voltage signal; and selectively activate the second plurality of switching devices based on a secondary control signal to generate the second voltage signal.

19. The vehicle battery charge of claim 18 wherein the at least one controller is further configured to generate a control variable that corresponds to a phase shift between the primary control signal and the secondary control signal, wherein the control variable enables the at least one controller to transfer power between the first active bridge and the second active bridge.

20. A vehicle battery charger comprising:
at least one transformer having a first winding and a second winding on a primary side of the at least one transformer that are connected to one another to form a middle point, the middle point of the at least one transformer for receiving an input voltage signal from a mains supply;
a half-bridge rectifier for receiving the input voltage signal from the mains supply to enable the middle point of the least one transformer to receive the input voltage signal from the mains supply; and
a first active bridge including a first plurality of switching devices to receive a first input signal from the first winding and to receive a second input signal from the second winding, wherein the first input signal and the second input signal are out of phase with one another to reduce electromagnetic interference (EMI) within the vehicle battery charger.

\* \* \* \* \*